(12) United States Patent
Reedy

(10) Patent No.: US 10,981,749 B2
(45) Date of Patent: Apr. 20, 2021

(54) HALF-MOON LIFTING DEVICE

(71) Applicant: TRINITY BAY EQUIPMENT HOLDINGS, LLC, Houston, TX (US)

(72) Inventor: Max Reedy, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 288 days.

(21) Appl. No.: 16/154,559

(22) Filed: Oct. 8, 2018

(65) Prior Publication Data

US 2019/0100403 A1 Apr. 4, 2019

Related U.S. Application Data

(63) Continuation-in-part of application No. 15/941,606, filed on Mar. 30, 2018, now Pat. No. 10,093,527, (Continued)

(51) Int. Cl.
*B65H 75/36* (2006.01)
*B65H 49/38* (2006.01)
(Continued)

(52) U.S. Cl.
CPC .......... *B65H 75/366* (2013.01); *B21C 47/24* (2013.01); *B65H 49/38* (2013.01); *B66F 9/18* (2013.01);
(Continued)

(58) Field of Classification Search
CPC .......... B65D 85/02; B65D 2519/00024; B65D 2519/00059; B65D 2519/00129; B65D 2519/00273; B65D 2519/00288; B65D 2519/00293; B65D 2519/00323; B65D 2519/00333; B65D 2519/00402; B65D 2519/00432; B65D 2519/00786; B65D 2519/00796; B65D 2519/00815;
(Continued)

(56) References Cited

U.S. PATENT DOCUMENTS

| | | | | |
|---|---|---|---|---|
| 1,698,038 A | * | 1/1929 | Warshaw | B65D 19/0075 108/57.24 |
| 1,723,320 A | * | 8/1929 | Zibelman | B62D 43/02 414/466 |

(Continued)

FOREIGN PATENT DOCUMENTS

| | | |
|---|---|---|
| CN | 204237520 | 4/2015 |
| CN | 204588624 | 8/2015 |

(Continued)

OTHER PUBLICATIONS

CN204237520—Machine Translation (Year: 2015).*

(Continued)

*Primary Examiner* — Michael A Riegelman
(74) *Attorney, Agent, or Firm* — Greenberg Traurig, LLP; Dwayne L. Mason; Mark G. Chretien

(57) ABSTRACT

A pipe coil lifting device includes a superstructure with a central longitudinal member and at least two supports attached to opposite sides of the central longitudinal member, with two channels at the outside long-edges of the superstructure attached to the supports, with a convex upper surface attached to the supports of the superstructure.

14 Claims, 8 Drawing Sheets

Related U.S. Application Data which is a continuation of application No. PCT/US2017/039096, filed on Jun. 23, 2017.

(60) Provisional application No. 62/355,812, filed on Jun. 28, 2016.

(51) Int. Cl.
*B66F 9/18* (2006.01)
*B21C 47/24* (2006.01)
*B66C 1/66* (2006.01)
*B60P 1/44* (2006.01)
*B60P 1/64* (2006.01)
*B65H 49/30* (2006.01)

(52) U.S. Cl.
CPC . *B60P 1/44* (2013.01); *B60P 1/64* (2013.01); *B65H 49/30* (2013.01); *B65H 2701/33* (2013.01); *B66C 1/66* (2013.01)

(58) Field of Classification Search
CPC .. B65D 2519/00825; B65D 2519/0084; B65D 19/0048; B65D 19/0095; B65D 19/44; B66F 9/18; B21C 47/24; B66C 1/66; B60P 1/64; B60P 3/035
See application file for complete search history.

(56) References Cited

U.S. PATENT DOCUMENTS

| | | | | |
|---|---|---|---|---|
| 2,434,140 | A * | 1/1948 | Bernstein | B65H 75/366 248/89 |
| 2,659,506 | A * | 11/1953 | Watkins | B66F 9/12 414/785 |
| 2,827,189 | A * | 3/1958 | Knudstrup | B66F 9/187 414/607 |
| 3,409,156 | A * | 11/1968 | Mills | B21C 47/242 414/607 |
| 3,511,400 | A * | 5/1970 | Oswald | B65D 19/44 414/608 |
| 3,690,492 | A * | 9/1972 | Shore | B21C 47/24 414/607 |
| 3,768,852 | A * | 10/1973 | Back | B66C 1/12 294/74 |
| 3,830,388 | A * | 8/1974 | Mott | B62B 3/10 414/429 |
| 3,990,650 | A * | 11/1976 | Devine | B65H 49/38 242/422.4 |
| 4,015,739 | A * | 4/1977 | Cox | A01D 87/127 414/703 |
| 4,023,690 | A * | 5/1977 | Goode | B60P 1/32 414/24.5 |
| 4,026,495 | A * | 5/1977 | Bartelt | B21C 47/003 242/129.62 |
| 4,365,768 | A * | 12/1982 | Woodruff | B65H 49/26 242/156.2 |
| 4,526,500 | A * | 7/1985 | Patrick | B60P 7/16 410/47 |
| 4,701,098 | A * | 10/1987 | Bills | B60P 3/035 180/19.2 |
| 4,735,153 | A * | 4/1988 | Wong | B65D 19/0012 108/57.16 |
| 4,762,291 | A * | 8/1988 | Sauber | B60P 3/035 242/559 |
| 4,793,801 | A * | 12/1988 | Roman | C21D 9/54 242/575.5 |
| 4,929,145 | A * | 5/1990 | Thompson | B66F 9/18 414/23 |
| D322,746 | S * | 12/1991 | Sassano | D8/356 |
| 5,236,087 | A * | 8/1993 | Morgan | B65D 85/66 206/397 |
| 5,372,469 | A | 12/1994 | Kobayashi | |
| 5,391,043 | A * | 2/1995 | Bohata | B65F 1/1452 414/422 |
| 5,809,907 | A * | 9/1998 | Bumgarner | B65D 19/0071 108/51.11 |
| 6,419,424 | B1 * | 7/2002 | Null | B65H 49/24 242/557 |
| 6,840,731 | B2 * | 1/2005 | Figiel | B66C 1/485 414/426 |
| 6,932,294 | B1 * | 8/2005 | Larson | B65H 49/32 242/390.5 |
| 9,120,636 | B2 * | 9/2015 | Cavirani | B65H 19/12 |
| 10,093,527 | B2 | 10/2018 | Reedy | |
| 10,654,395 | B1 * | 5/2020 | White | B60P 3/035 |
| 10,730,719 | B2 * | 8/2020 | Franklin-Hensler | B65H 49/36 |
| 2002/0045025 | A1 * | 4/2002 | Huang | B21C 47/24 428/138 |
| 2009/0090069 | A1 * | 4/2009 | Willis | E04H 12/08 52/79.12 |
| 2012/0141242 | A1 * | 6/2012 | Savolainen | B66F 9/122 414/664 |
| 2013/0277151 | A1 * | 10/2013 | Giannetti | B66F 9/183 187/237 |
| 2013/0320172 | A1 * | 12/2013 | Skorupa | B60P 7/12 248/309.1 |
| 2014/0193235 | A1 * | 7/2014 | Kennedy | B65H 49/38 414/812 |
| 2014/0246272 | A1 * | 9/2014 | Szlezak | B23K 26/24 187/237 |
| 2014/0374193 | A1 * | 12/2014 | Meijer | B66F 9/122 187/237 |
| 2016/0137469 | A1 * | 5/2016 | Giannetti | B66F 9/184 414/21 |
| 2016/0257444 | A1 * | 9/2016 | Wilhelm | B65D 19/0073 |
| 2016/0311572 | A1 * | 10/2016 | Wilhelm | B65D 19/0026 |
| 2017/0291527 | A1 * | 10/2017 | White | E21B 19/008 |
| 2018/0186269 | A1 * | 7/2018 | Barnett | B65H 75/32 |
| 2018/0201176 | A1 * | 7/2018 | Reedy | B63B 25/004 |
| 2018/0222733 | A1 * | 8/2018 | Reedy | B60P 1/64 |
| 2019/0100403 | A1 * | 4/2019 | Reedy | B65H 75/366 |
| 2019/0100421 | A1 * | 4/2019 | Reedy | B65D 19/0095 |
| 2019/0161269 | A1 * | 5/2019 | Hamner | B65D 19/0048 |
| 2019/0233163 | A1 * | 8/2019 | Hamner | B61D 45/003 |
| 2019/0241353 | A1 * | 8/2019 | Reedy | B60P 3/035 |

FOREIGN PATENT DOCUMENTS

| | | |
|---|---|---|
| CN | 106081311 | 9/2018 |
| CN | 109562424 | 4/2019 |
| EA | 201990121 | 5/2019 |
| EP | 2447464 | 3/2016 |
| EP | 3475006 | 5/2019 |
| FR | 2725972 | 10/1994 |
| JP | 10219905 | 8/1998 |
| JP | 2000271628 | 10/2000 |
| JP | 2015054326 | 3/2015 |
| WO | 2018/005296 | 4/2018 |

OTHER PUBLICATIONS

Australian Government, IP Australia; Examination Report No. 1 for Standard Patent Application, issued in connection to AU2017288912; dated Jul. 1, 2019; 2 pages; Australia.

Ministry of Science and Technology, Intellectual Property Office of Vietnam; Office Action, issued in connection to Application No. 1-2019-00408; dated Mar. 8, 2019; 2 pages; Vietnam.

European Patent Office; Extended European Search Report, issued in connection to EP19198997.9; 8 pages; dated Mar. 5, 2020; Europe.

European Patent Office; Extended European Search Report, issued in connection to EP19198995; 8 pages; dated Mar. 5, 2020; Europe.

European Patent Office; Extended European Search Report, issued in connection to EP17820982.1; 6 pages; dated Mar. 2, 2020; Europe.

Colombian Patent and Trademark Office; Official Action issued in connection to application No. NC2019/0000685; 6 pages; dated Feb. 12, 2020; Colombia.

(56) References Cited

OTHER PUBLICATIONS

Government of the Republic of Trinidad and Tobago; Office Action, issued in connection to application No. TT/A/2018/00135; dated Jan. 6, 2020; 1 page; Trinidad & Tobago.
Indian Patent Office; First Examination Report, issued in connection to application No. 201817046455; dated Jul. 14, 2020; 7 pages; India.
Indonesia Patent Office; Notice of the Result of Substantive Examination Pursuant to Article 62(3) of Indonesian Patent Law No. 13/2016, issued in connection to application No. PID201811039; dated Jul. 24, 2020; 4 pages; Indonesia.
European Patent Office; Extended European Search Report, issued in connection to EP19190504.1; dated Apr. 1, 2020; Europe.
Australian Government Notice of Acceptance for Patent Examiner.
Intellectual Property Office of Singapore; Invitation to Respond to Written Opinion, issued in connection to application No. 11201811127T; dated Mar. 16, 2020; 8 pages; Singapore.
United States Patent and Trademark Office; PCT International Search Report, issued in connection to PCT/US17/39096; dated Sep. 13, 2017; 2 pages; U.S.
United States Patent and Trademark Office; PCT Written Opinion of the International Searching Authority, issued in connection to PCT/US17/39096; dated Sep. 13, 2017; 5 pages; U.S.
The Eurasian Patent Organization; Official Notification, issued in connection with application No. 201990121/31; 5 pages; dated Oct. 29, 2019; Russia.
Canadian Intellectual Property Office; Examiner's Report, issued in connection to application No. 3040742; dated Nov. 19, 2019; 4 pages; Canada.
China National Intellectual Property Administration; First Office Action, issued in connection to application No. 201780039507X; dated Dec. 6, 2019; 17 pages; China.
Colombian Patent and Trademark Office; Official Action issued in connection to application No. NC2019/0000685; 10 pages; dated Sep. 13, 2019; Colombia.
Ministry of Economy of National Institute of Industrial Property of Brazil; Writen Opinion, issued in connection to application No. BR112018076786-7; dated Sep. 7, 2020; 11 pages; Brazil.
China National Intellectual Property Administration; Second Office Action, issued in connection to application No. 201780039507X; dated Aug. 21, 2020; 9 pages; China.

* cited by examiner

HALF-MOON LIFTING DEVICE

CROSS-REFERENCE TO RELATED APPLICATIONS

This application is a continuation-in-part of U.S. patent application Ser. No. 15/941,606, entitled "HALF-MOON LIFTING DEVICE" filed Mar. 30, 2018, which is herein incorporated by reference in its entirety for all purposes.

BACKGROUND

Flexible pipe is useful in a myriad of environments, including in the oil and gas industry. Flexible pipe may be durable and operational in harsh operating conditions and can accommodate high pressures and temperatures. Flexible pipe may be bundled and arranged into one or more coils to facilitate transporting and using the pipe.

The flexible pipe may be transported as coils to various sites for deployment (also referred to as uncoiling or unspooling). Different types of devices and vehicles are currently used for loading and transporting coils of pipe, but usually extra equipment and human manual labor is also involved in the process of loading or unloading such coils for transportation and/or deployment. Such coils of pipe are often quite large and heavy. Accordingly, there exists a need for an improved method and apparatus for loading and unloading coils of pipe.

SUMMARY

Various nonlimiting embodiments provide methods and apparatus for moving coils of flexible pipe. In one nonlimited embodiment, a pipe coil lifting device includes a superstructure with a central longitudinal member and at least two supports attached to opposite sides of the central longitudinal member, with two channels at the outside long-edges of the superstructure attached to the supports, with a convex upper surface attached to the supports of the superstructure.

In other nonlimiting embodiments, a pipe coil lifting device includes a superstructure having a pair of longitudinal channel portions attached to and forming sides of an outermost portion of the superstructure, a longitudinal central member extending between the channel portions having at least two supports perpendicular and attached to opposite sides of the longitudinal central member and channel portions, and wherein the top of the superstructure forms a convex upper surface attached to the channel portions, central member and supports.

In further nonlimiting embodiments, method for lifting a pipe coil includes lifting a coil of flexible pipe with a pipe coil lifting device, the pipe coil lifting device comprising a superstructure with a central member and at least two supports perpendicular and attached to opposite sides of the central member, with two channels at the outside long-edges of the superstructure, with a convex surface attached to the supports of the superstructure.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION

Embodiments of the present disclosure relate generally to a pipe coil device for use in transporting and/or deploying coils of pipe using a forklift or a crane. Coils of pipe may be self supported, for example, using bands to hold coils together, or coils of pipe may be supported around a reel (which may be referred to as a reel of pipe). Coil lifting devices according to embodiments of the present disclosure for use lifting coils held together with using bands or straps may include a superstructure with a central longitudinal member and one or more cross-members, with two channels at the outside long-edges of the superstructure attached to the cross-members, with a convex upper surface attached to the cross-members of the superstructure.

Embodiments of the present disclosure will be described below with reference to the figures. In one aspect, embodiments disclosed herein relate to embodiments for a Half-Moon Lifting Device configured to transport coils of flexible pipe.

Figure 1:
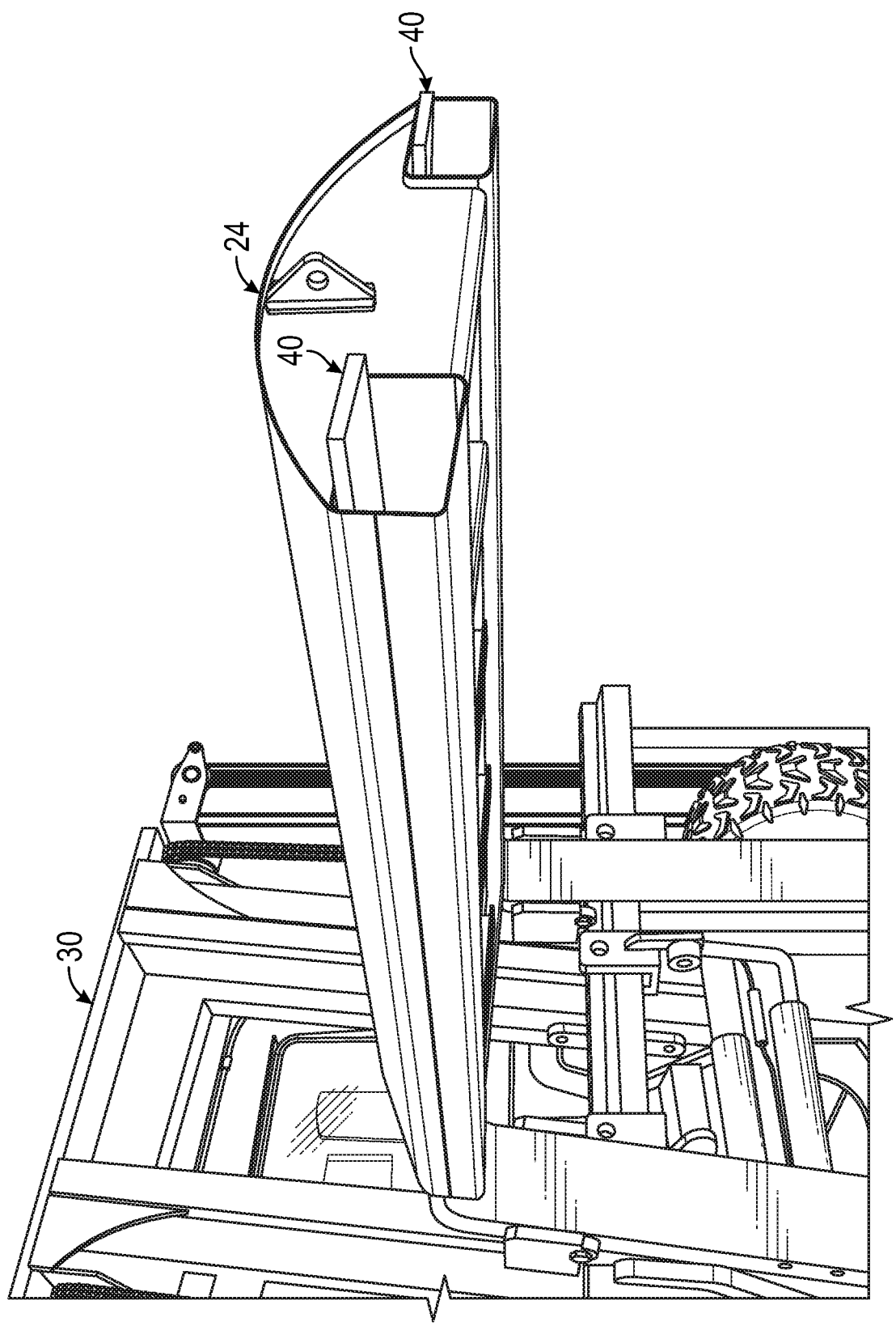
FIG. 1 is a diagram of a pipe coil lifting device mounted on tines of a forklift according to embodiments of the present disclosure.

FIG. 1 shows a diagram of a Half-Moon Lifting Device 24 disposed on the tines 40 of a forklift 30 according to embodiments of the present disclosure. A forklift may be equipped with a hydraulic side-shift function for moving or adjusting the forks or tines.

Figure 2:
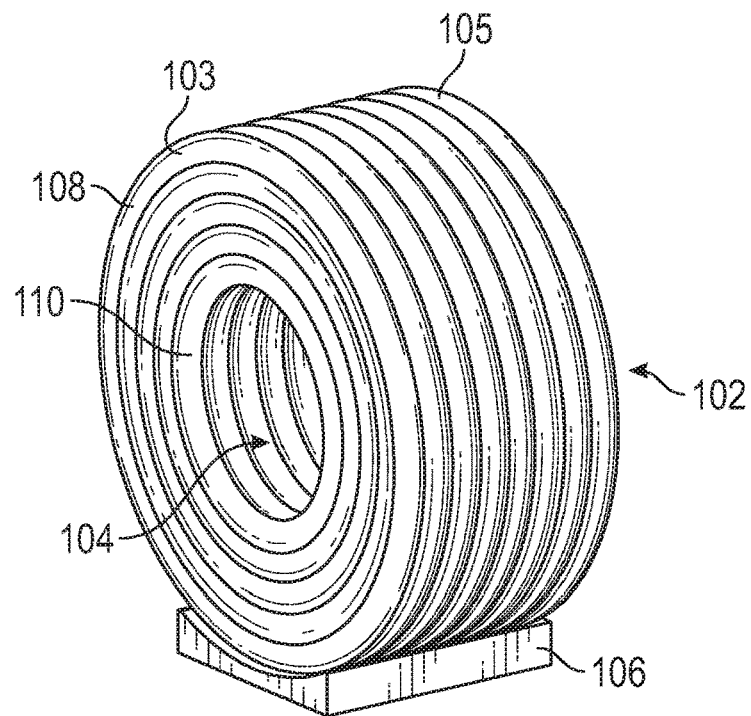
FIG. 2 is a diagram of a coil of pipe according to embodiments of the present disclosure.
Figure 3:
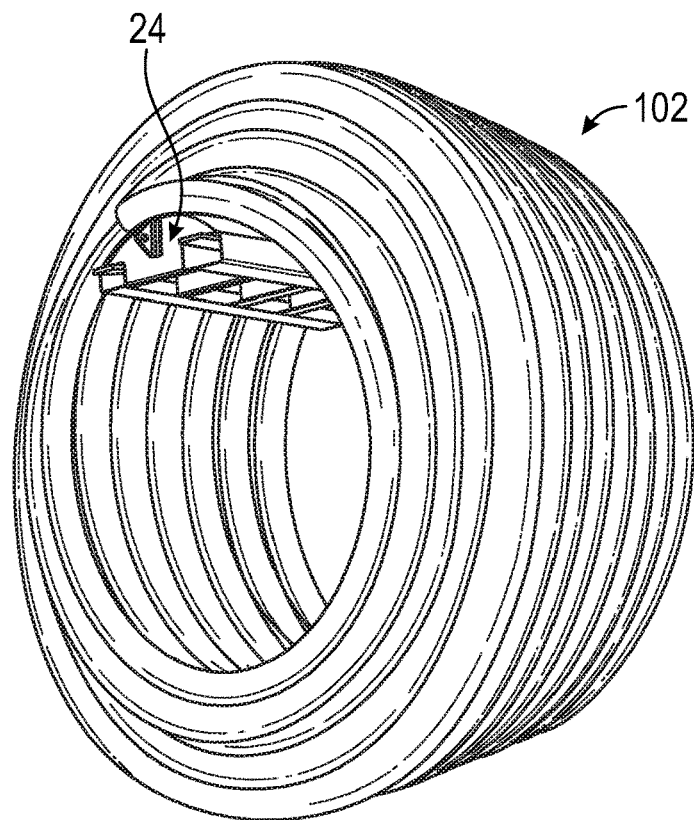
FIG. 3 is a diagram of a coil of pipe lifted disposed on a pipe coil lifting device using a forklift according to embodiments of the present disclosure.

Coil of pipe 102 may be formed by wrapping pipe into a coil with an interior channel 104 formed axially therethrough, where the coil of pipe 102 may be moved as a single package or bundle of coiled pipe, as shown in FIG. 2. In FIG. 3 a coil of pipe 102 is illustrated disposed on the Half-Moon Lifting Device 24. Each complete turn of coiled pipe may be referred to as a wrap of pipe. Multiple wraps of pipe in a coil of pipe may be configured in columns along an axial dimension of the coil of pipe and/or configured in layers along a radial dimension of the coil of pipe. For example, multiple columns of wraps may be formed along an axial direction of the coil of pipe, where the axial dimension of the coil of pipe is based on the diameter of the pipe and the number and axial position of wraps forming the coil of pipe 102. Further, multiple layers of wraps may be formed along a radial direction of the coil of pipe, where the radial dimension of the coil of pipe is based on the diameter of the pipe and the number and radial position of the wraps forming the coil of pipe.

As shown in FIG. 2, coil of pipe 102 may be one or more layers (e.g., layers 108 and 110) of pipe packaged or bundled into a larger coil. Coil of pipe 102 may include at least one or more layers of pipe that has been coiled into a particular shape or arrangement. As shown in FIG. 2, coil of pipe 102 is coiled into a substantially cylindrical shape having substantially circular bases 103 and 105 formed on each end of coil of pipe 102, where the axial dimension of coil of pipe 102 is measured between the two bases 103, 105. In addition, the coil of pipe may be attached to a pipe coil skid 106.

A pipe, as understood by those of ordinary skill, may be a tube to convey or transfer any water, gas, oil, or any type of fluid known to those skilled in the art. The pipe used to make up coil of pipe 102 may be made of any type of materials including without limitation plastics, metals, a combination thereof, composites (e.g., fiber reinforced composites), or other materials known in the art.

In one or more embodiments, the pipe used to make up coil of pipe 102 may be a flexible type of pipe. Flexible pipe is used frequently in many applications, including without limitation, both onshore and offshore oil and gas applications. Flexible pipe may include Flexible Composite Pipe (FCP) or Reinforced Thermoplastic Pipe (RTP). A FCP/RTP pipe may itself be generally composed of several layers. In one or more embodiments, a flexible pipe may include a high-density polyethylene ("HDPE") pipe having a reinforcement layer and an HDPE outer cover layer. Additionally, various types of polyethylene are available for flexible pipe composition. Other polymers may also be used such as nylon, PVDF, polypropylene and many others. Thus, flexible pipe may include different layers that may be made of a variety of materials and also may be treated for corrosion resistance. For example, in one or more embodiments, pipe used to make up a coil of pipe may have a corrosion protection shield layer that is disposed over another layer of steel reinforcement. In this steel reinforced layer, helically wound steel strips may be placed over a liner made of thermoplastic pipe. Flexible pipe may be designed to handle a variety of pressures. Further, flexible pipe may offer unique features and benefits versus steel/carbon steel pipe lines in the area of corrosion resistance, flexibility, installation speed and re-usability.

Coils of pipe may be made with coil having an outer diameter ranging, for example, from about 2 inches (5.1 cm) to about 10 inches (25.4 cm). However, pipe having other dimensions may be coiled to form a coil of pipe and loaded for transportation according to embodiments of the present disclosure. Accordingly, pipe that that may be spooled or coiled into coil of pipe 102 may be made to suit a number of dimensions and may have any diameter useful to a particular project.

As known to those of ordinary skill in the art, pipe used to make up coil of pipe 102 may be coiled using spoolers or other coiler machines suited for such a function. Those of ordinary skill will recognize that the present disclosure is not limited to any particular form of coiler or other device that may be used to form pipe into a coil. Coiling pipe into a coil of pipe, such as 102, assists when transporting pipe, which may be several hundred feet in length in one or more embodiments. Further, coil of pipe 102 may be assembled as a coil to facilitate deployment of the coil. Deployment, as described above and used herein, may refer to the action of unspooling or unwinding the pipe from coil of pipe 102.

After being assembled into a coil, coil of pipe 102 may include an interior channel 104 formed axially through the coil of pipe 102. Interior channel 104 is a bore disposed generally in the center of coil of pipe 102. Interior channel 104 is substantially circular shaped. The coil of pipe 102 may have an outer diameter (OD) and an inner diameter (ID), where the inner diameter is defined by the interior channel.

In one or more embodiments, coil of pipe 102 may have an outer diameter ranging from about 60 inches (1.5 m), which may occur, for example, when coil of pipe 102 has at least two layers of 2 inch pipe, to about 192 inches (4.9 m). In one or more embodiments, a coil of pipe may have an inner diameter ranging, for example, from about 84 inches (2.1 m) to about 126 inches (3.2 m). Further, in one or more embodiments, a coil of pipe may have an axial dimension (width) ranging from about 5 inches (12.7 cm) to about 92 inches (2.3 m). However, these are merely exemplary measurements. Those of ordinary skill in the art will appreciate that any range of dimensions (inner and outer diameters and width) may be accommodated using one or more embodiments.

Skid 106 illustrated in FIG. 2 may be a platform upon which coil of pipe 102 may be disposed to hold the coil of pipe 102 in a vertical orientation. In one or more embodiments, coil of pipe 102 may be loaded and unloaded for transportation while remaining on skid 106.

Figure 4:
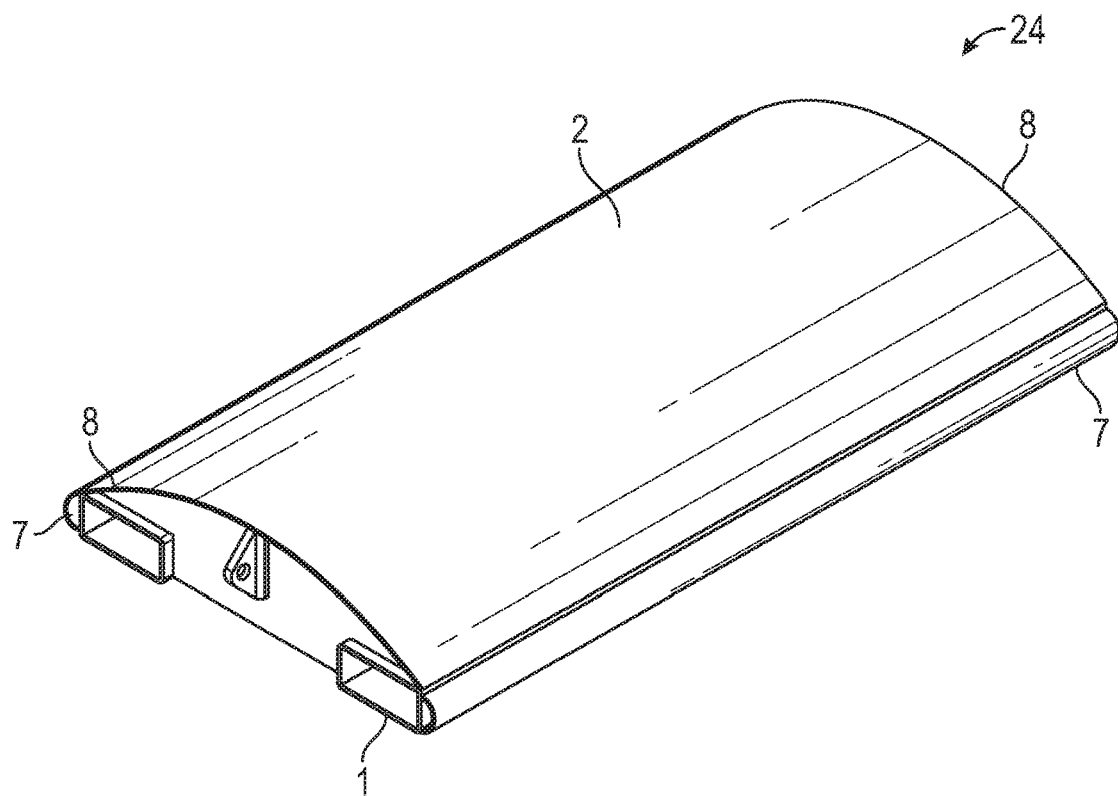
FIG. 4 illustrates a top view of a pipe coil lifting device according to embodiments of the present disclosure.

Now turning to FIG. 4 various illustrative embodiments of a pipe coil lifting device 24 ('Half-Moon Lifting Device') are illustrated. The device is used to access the interior diameter of a coil of pipe 102, and used with a forklift to carry and move the pipe. Various aspects of a lifting device 24 suitable for moving a coil of pipe with a wide range of diameters are illustrated in FIGS. 4 to 16. It should be noted that various sizes of lifting devices are suitable for moving a coil of pipe.

Figure 5:
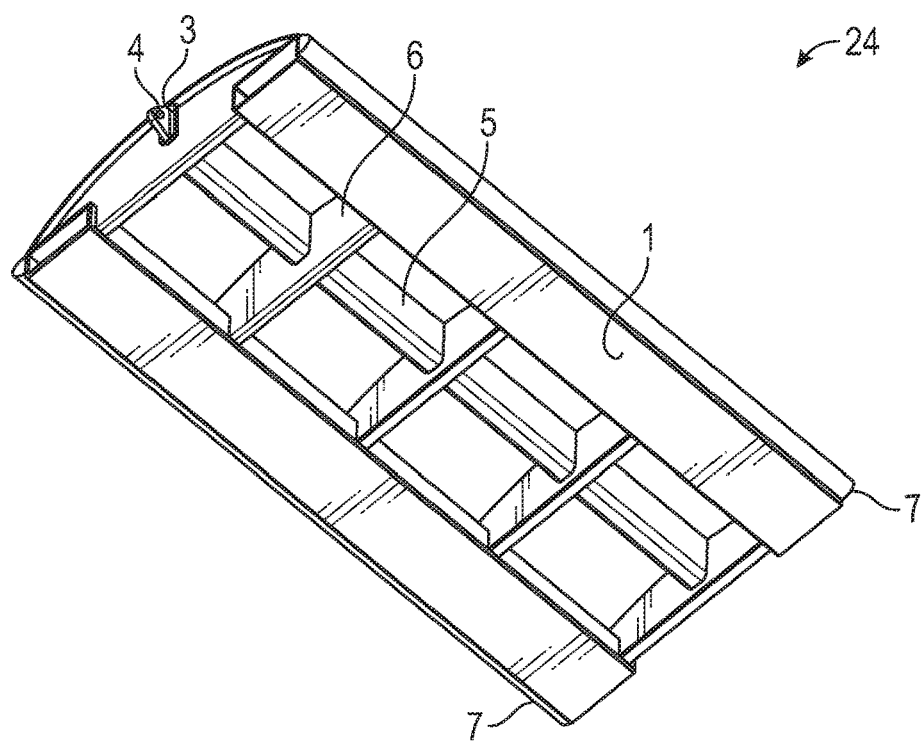
FIG. 5 illustrates a view from under a pipe coil lifting device according to embodiments of the present disclosure.
Figure 14:
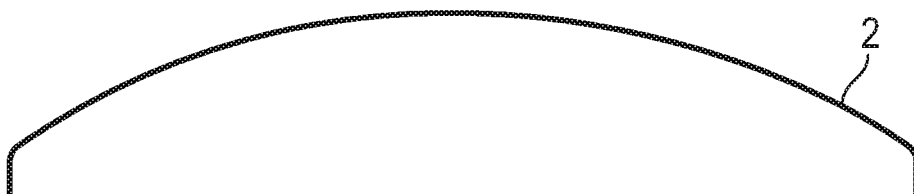
FIG. 14 illustrates a cross sectional view of the upper surface of a pipe coil lifting device according to embodiments of the present disclosure.

As illustrated in FIG. 5, the device has a superstructure including a pair of channels (or channel portions) 1, the channels or channel portions accommodating forks or tines of a forklift. In addition the channels may accommodate means for securing the lifting device to the tines of a forklift. An upper surface 2 of the device 24, may be arched to attach to the top of cross-members 6, of which there may be one or more, for example five cross-members 6 as illustrated in FIG. 5. The upper surface 2 may overlap onto the outside surface of the channels 1 (see also FIG. 14 illustrating overlap portion to attach to channel). This overlap of surface 2 onto channels 1 as well as surface 2 attached to cross-member 6 helps provide stiffness to the lifting device 24. The device 24 may include device member 3, of which there may be two for the device 24, (see also FIG. 10). End member 4 as illustrated, of which there may be two on either end of the device 24, (see also FIG. 9) is suitable for attaching the device 24 to cables for use with a crane. Device member 3 and end member 4 are attached to a longitudinal central member 5. Cross-members 6, illustrated in FIG. 8 and FIG. 12, of which there may be one or more, has an upper edge that meets upper surface 2. A half-pipe 7, for example a schedule 40 pipe split lengthwise, may be attached to the outer surfaces of channels 1 to provide protection to the interior surfaces of coiled pipe so as to protect the pipe material from angled surfaces on the lifting device 24 (see also FIG. 16). Likewise, on one or either end of upper surface 2, a round bar 8, for example a ¼ inch or similar appropriate size, may be attached along the arcuate edge that will also provide sharp-edge protection to the pipe material to be moved with the lifting device 24 and is further illustrated in FIG. 15.

In certain illustrative embodiments, lifting device 24 can be formed of steel or other metal material. In certain illustrative embodiments the lifting devices are capable of a 20 ton rating, or for a rated load of 40,000 lbs.

Figure 6:
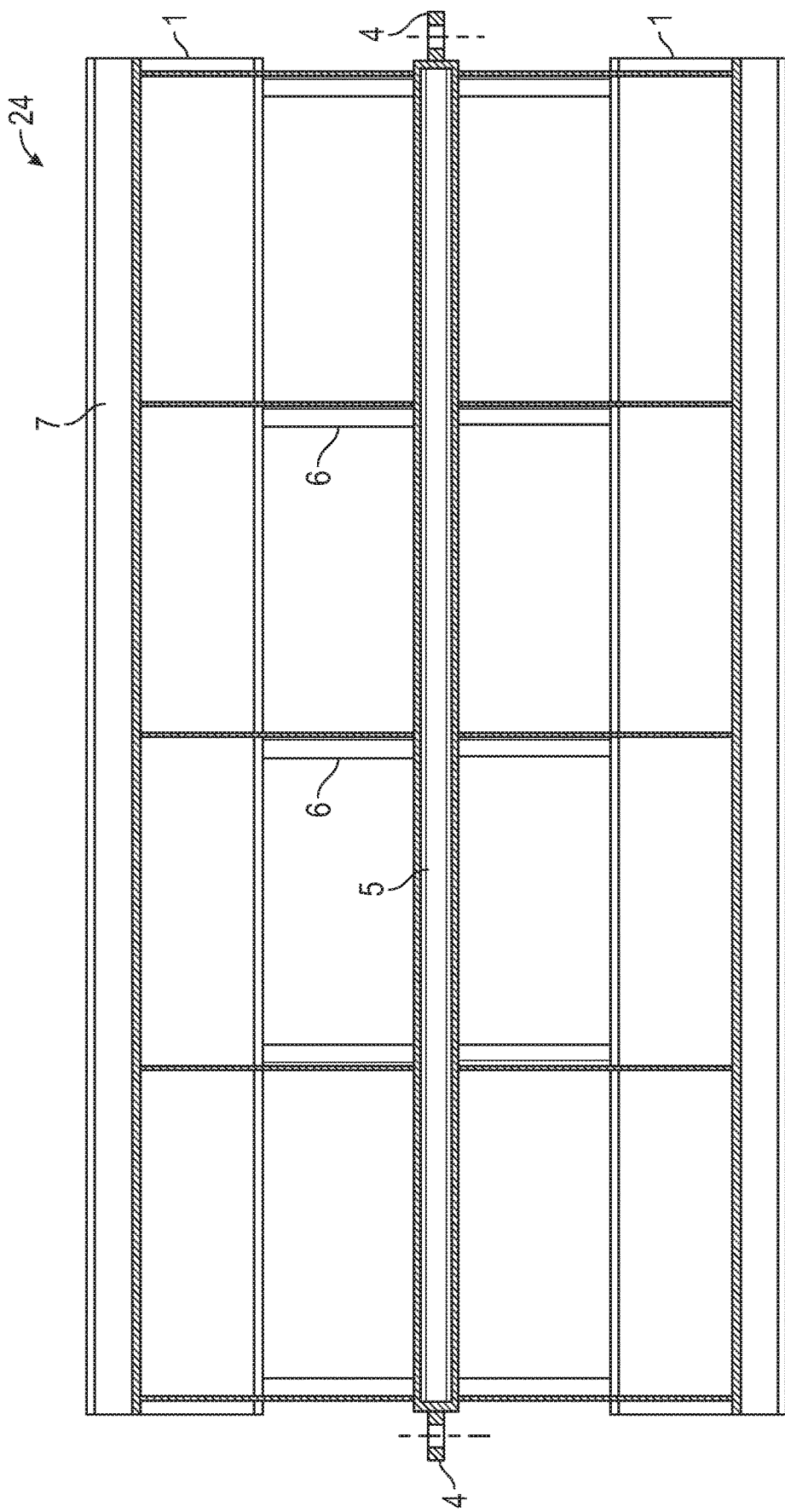
FIG. 6 illustrates a cross-sectional view a pipe coil lifting device according to embodiments of the present disclosure.
Figure 7:
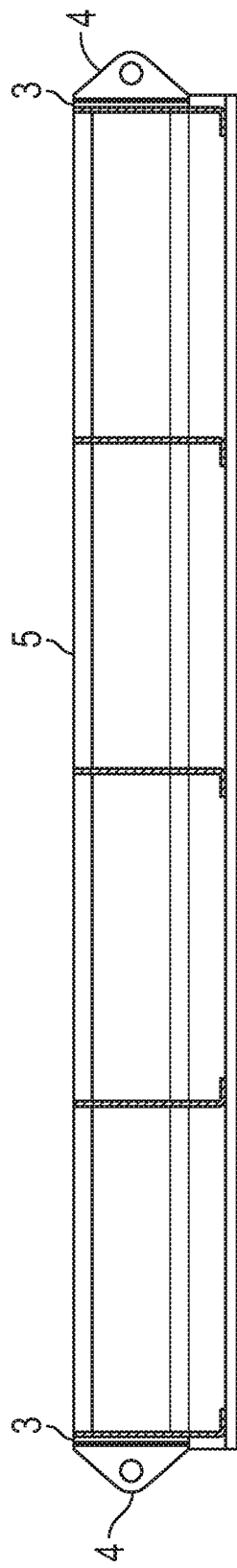
FIG. 7 illustrates a cross-sectional view of a pipe coil lifting device according to embodiments of the present disclosure.
Figure 8:
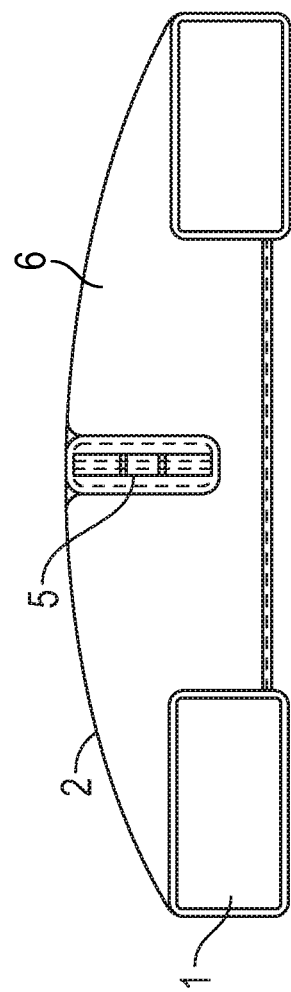
FIG. 8 illustrates a cross-sectional view of a pipe coil lifting device according to embodiments of the present disclosure.
Figure 9:
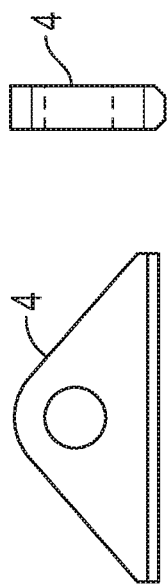
FIG. 9 illustrates an end member for a pipe coil lifting device according to embodiments of the present disclosure.
Figure 10:
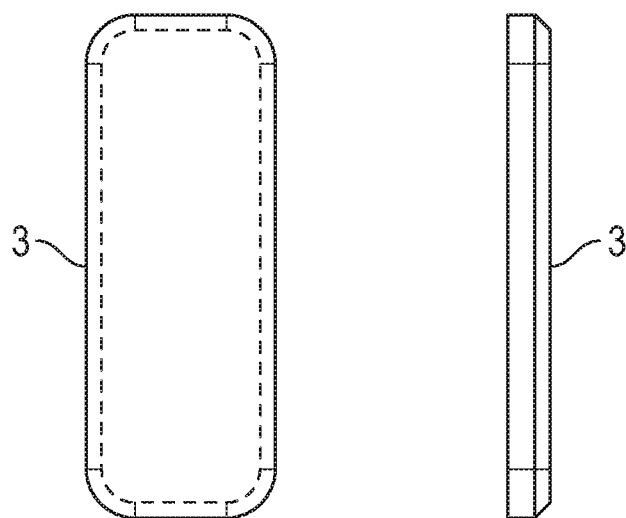
FIG. 10 illustrates a device member for a pipe coil lifting device according to embodiments of the present disclosure.
Figure 11:
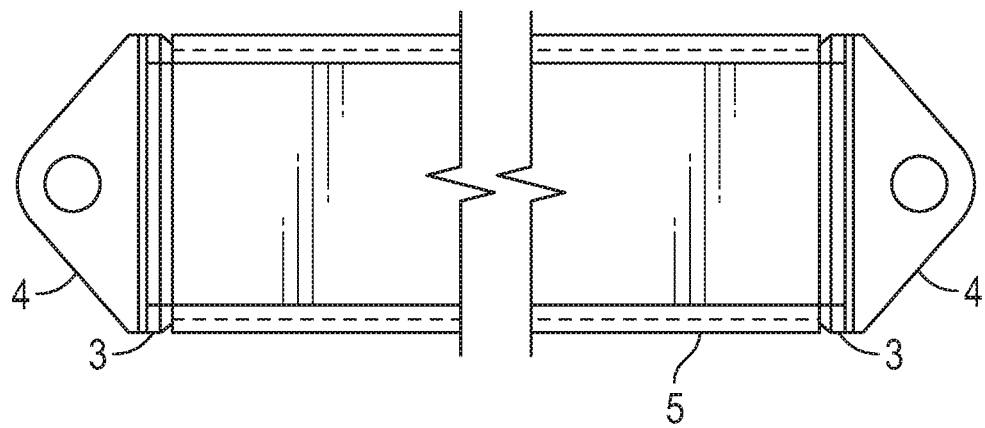
FIG. 11 illustrates the positions of an end-member attached to device-member that is attached to a central member according to embodiments of the present disclosure.
Figure 12:
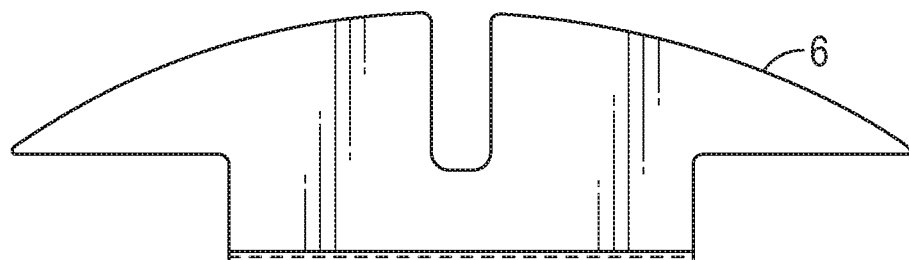
FIG. 12 illustrates a cross-member for a pipe coil lifting device according to embodiments of the present disclosure.
Figure 13:
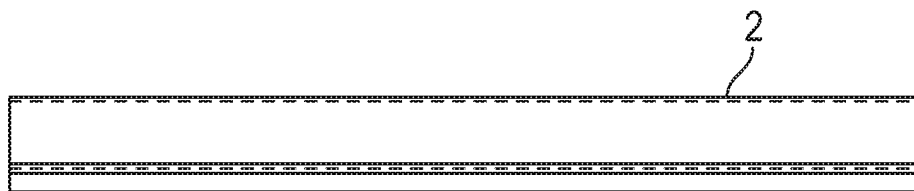
FIG. 13 illustrates an upper surface of a pipe coil lifting device according to embodiments of the present disclosure.

Lifting device 24 supporting various diameter coils, is illustrated in cross-section with FIG. 6. FIG. 7 illustrates another cross-sectional view showing the spacing between the cross-members 6. FIG. 8 illustrates still another cross-sectional view through lifting device 24 showing cross member 6, central member 5 and channels 1. FIG. 9 illustrates two views of end-member 4. FIG. 10 illustrates further detail of device member 3. FIG. 11 illustrates the positions of end-member 4 attached to device-member 3 shown attached to central member 5. FIG. 12 illustrates a cross-member 6. FIG. 13 illustrates a side view of upper surface 2. FIG. 14 is cross section of upper surface 2.

Figure 15:
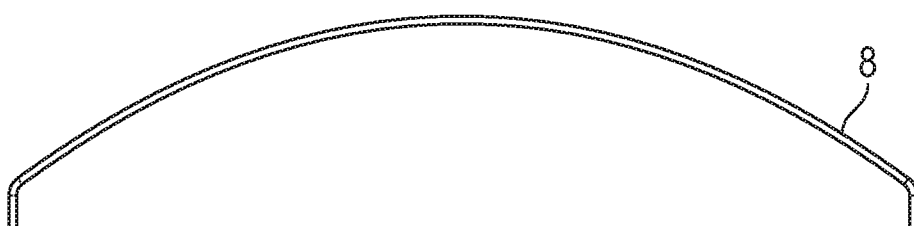
FIG. 15 illustrates the position of a bar at the end of the upper surface of a pipe coil lifting device according to embodiments of the present disclosure.
Figure 16:
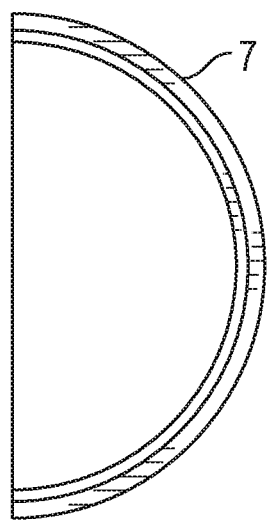
FIG. 16 illustrates the half pipe attached to the channel for a pipe coil lifting device according to embodiments of the present disclosure.

FIG. 15 illustrates the round bar 8 may be attached along the arcuate edge and may extend at least partially over channels 1. FIG. 16 illustrates half-pipe 7, which may be a schedule 40 pipe (for example split in two pieces along the central axis) for attachment to the channel 1 or the channel 1 and the overlap portion of upper surface 2.

In general a lifting device 24 is capable of use with various diameter coils without damaging the outside surfaces of the coils of pipe contacted by the long-sides of the lifting device 24 during movement by a forklift.

Figure 17:
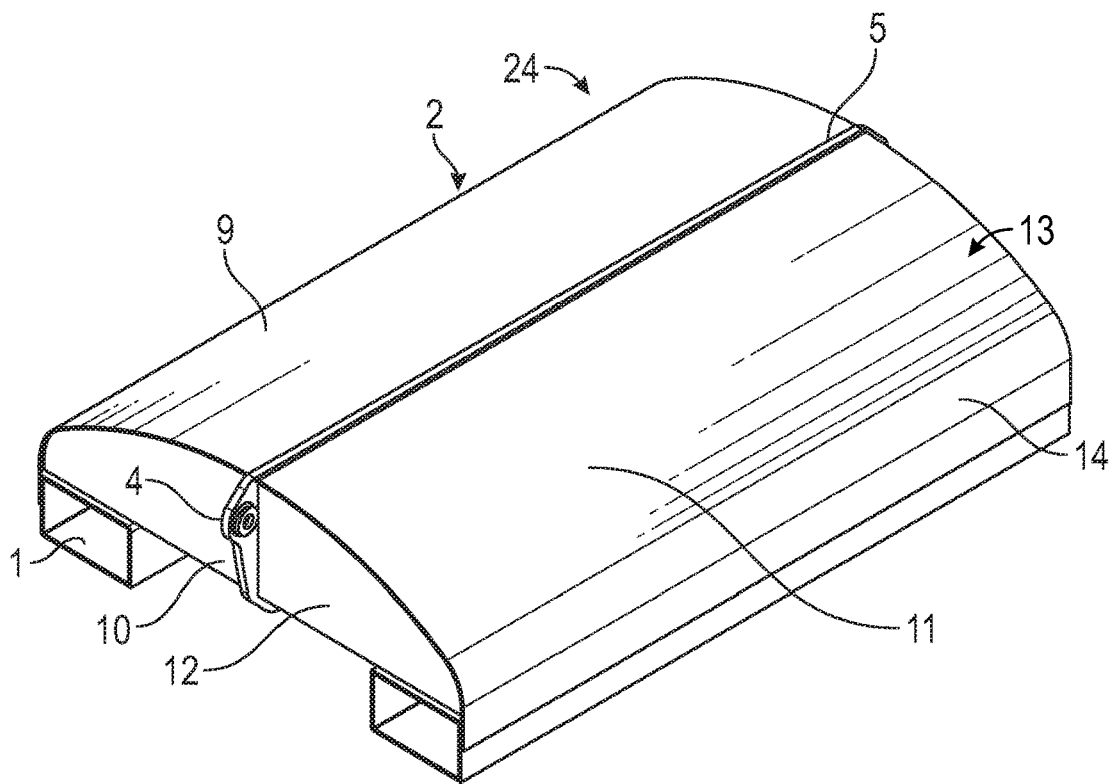
FIG. 17 illustrates a top view of a pipe coil lifting device according to embodiments of the present disclosure.
Figure 18:
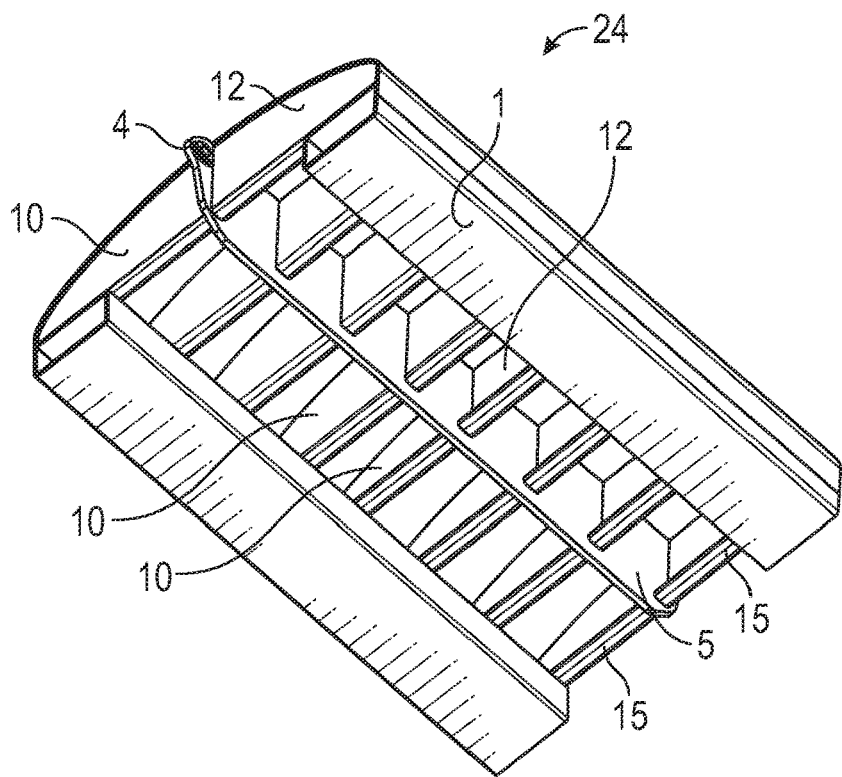
FIG. 18 illustrates a view from under a pipe coil lifting device according to embodiments of the present disclosure.

FIGS. 17 and 18 illustrate perspective views of another embodiment of the pipe coil lifting device 24, which may capable of a 34 ton rating, or for a rated load of 68,000 lbs. Elements in common with those shown in previous figures are labeled with the same reference numerals. As shown in FIGS. 17 and 18, the upper surface 2 comprises a first upper surface section 9 attached to a first support 10 coupled to a first side of the central member 5, and a second upper surface section 11 attached to a second support 12 coupled to a second side of the central member 5. In other embodiments, the upper surface 2 may be configured as a single section or divided into more than two sections. The first and second sides of the central member 5 may be opposite from one another. In certain embodiments, the central member 5 may be configured as a single plate of steel or similar material. In further embodiments, the lifting device 24 may include a plurality of first supports 10 and a plurality of second supports 12 spaced apart from one another to provide support along the length of the lifting device 24. In the illustrated embodiment, the lifting device 24 includes eight (8) first supports 10 and eight (8) second supports 12 with the first and eighth supports 10 and 12 serving as ends of the lifting device 24.

In certain embodiments, a coating 13 may be applied to an outer surface of the upper surface 2. For example, the coating 13 may be a rubberized coating, polymer, paint, sheet, or layer applied to the upper surface 2 and configured to provide a surface that will reduce the likelihood of damaging the interior channel 104 of the coil of pipe 102. In further embodiments, the upper surface 2 may include curves 14 near the channels 1 to also reduce the likelihood of damaging the coil of pipe 102. In such embodiments, the half-pipes 7 may be omitted.

In the illustrated embodiment of FIGS. 17 and 18, the central member 5 includes end members 4 suitable for attaching the lifting device 24 to cables for use with a crane. The end members 4 may be attached to the central member 5 or may be an integral or formed part of the central member 5. Further, the channels 1 may be attached to lower surfaces 15 of the supports 10 and 12.

In one nonlimiting embodiment a pipe coil lifting device comprises a superstructure with a central longitudinal member and at least one cross-member, with two channels at the outside long-edges of the superstructure attached to the cross-members, and a convex upper surface is attached to the cross-members of the superstructure.

In other aspects, the pipe coil lifting device upper surface is attached to and overlaps upon the outside surface of the channels. Further, the pipe coil lifting device may have a device member attached to the central member and an end member attached to the central member. The central longitudinal member may extend beyond the upper surface and comprise an end member suitable for attaching cable fittings. Half-pipes may be attached to the lateral outside surfaces of the channels. A ¼ inch round bar may be attached to the arcuate edge of the convex upper surface.

In another nonlimiting embodiment, a pipe coil lifting device comprises a superstructure having a pair of longitudinal channel portions attached to and forming sides of an outermost portion of the superstructure. A longitudinal central member extends between the channel portions with the superstructure having at least one cross-member perpendicular and attached to the central member and channel portions. The top of the superstructure forms a convex upper surface attached to the channel portions, central member and cross-members.

In other aspects, the upper surface of the pipe coil lifting device overlaps upon the outside surface of the channel portions. A device member may be attached to the central member and an end member attached to the central member. The longitudinal central member may extend beyond the upper surface and comprise an end member for attaching cable fittings. Half-pipes may be attached to the lateral outside surfaces of the channel portions. A ¼ inch round bar attached to the arcuate edge of the convex upper surface.

In still another nonlimiting embodiment, a method is provided for lifting a pipe coil the method comprising lifting a coil of flexible pipe with a pipe coil lifting device disposed on a forklift, the pipe coil lifting device comprising a superstructure with a central member and at least one cross-member perpendicular to the cross member, with two channels at the outside long-edges of the superstructure, with a convex surface attached to the cross-members of the superstructure. When using the lifting device with a forklift, a hydraulic side-shift function of the forklift may be used to secure the lifting device to the tines of the forklift. Alternatively, the lifting device may be attached for moving a pipe coil with a crane using a cable or chain attached to end members of the central member of the device.

While the present disclosure has been described with respect to a limited number of embodiments, for example lifting devices for coils with inside diameters of seven and nine feet, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipe coil lifting device comprising:
    a first channel configured to accommodate a first tine of a forklift;
    a second channel configured to accommodate a second tine of the forklift;
    a central longitudinal member that extends parallel to the first channel and the second channel;
    a first support attached to the first channel and the central longitudinal member;
    a second supports attached to the second channel and the central longitudinal member; and
    a convex upper surface attached to the central longitudinal member and to upper edges of the first support and the second support, wherein the central longitudinal member is exposed through the convex upper surface.

2. The pipe coil lifting device of claim 1, wherein the convex upper surface comprises:
    a first upper surface section attached to a first top surface of the first channel and a first side surface of the central longitudinal member; and
    a second upper surface section attached to a second top surface of the second channel and a second side surface of the central longitudinal member.

3. The pipe coil lifting device of claim 1, wherein the central longitudinal member comprises end members at opposite ends of the central longitudinal member.

4. The pipe coil lifting device of claim 1, wherein the convex upper surface overlaps upon a first outside surface of the first channel and a second outside surface of the second channel to facilitate stiffening the pipe coil lifting device.

5. The pipe coil lifting device of claim 1, comprising a coating applied on the convex upper surface.

6. The pipe coil lifting device of claim 1, wherein the convex upper surface comprises:
    a first curve that changes the convex upper surface from a first radius of curvature to a second radius of curvature to facilitate protecting an interior surface of a pipe coil loaded on the pipe coil lifting device; and
    a second curve that changes the convex upper surface from the first radius of curvature to the second radius of curvature to facilitate protecting the interior surface of the pipe coil loaded on the pipe coil lifting device.

7. A method for lifting a pipe coil comprising:
    inserting a pipe coil lifting device into an interior channel of the pipe coil, wherein the pipe coil lifting device comprises:
        a first channel that accommodates a first tine of a forklift;
        a second channel that accommodates a second tine of the forklift;
        a central longitudinal member that extends parallel to the first channel and the second channel;
        a first supports perpendicular and attached to the first channel and the central longitudinal member;
        a second support attached to the second channel and the central longitudinal member; and
        a convex surface attached to the central longitudinal member and to upper edges of the first support and the second support, wherein the central longitudinal member is exposed through the convex upper surface; and
    lifting the pipe coil using the pipe coil lifting device.

8. The method of claim 7, wherein the convex upper surface of the pipe coil lifting device comprises:
    a first upper surface section attached to a first top surface of the first channel and a first side surface of the central longitudinal member; and
    a second upper surface section attached to a second top surface of the second channel and a second side surface of the central longitudinal member.

9. The method of claim 7, wherein the central longitudinal member comprises end members at opposite ends of the central longitudinal member.

10. The method of claim 7, wherein the convex upper surface of the pipe coil lifting device comprises:
    a first curve that changes the convex upper surface from a first radius of curvature to a second radius of curvature to facilitate protecting an interior surface of the pipe coil; and
    a second curve that changes the convex upper surface from the first radius of curvature to the second radius of curvature to facilitate protecting the interior surface of the pipe coil.

11. The method of claim 7, wherein lifting the pipe coil using the pipe coil lifting device comprises:
    inserting the first tine of the forklift into the first channel of the pipe coil lifting device;
    inserting the second tine of the forklift into the second channel of the pipe coil lifting device; and
    lifting the pipe coil at least in part by operating the forklift to raise the first tine and the second tine.

12. The method of claim 7, wherein lifting the pipe coil using the pipe coil lifting device comprises lifting the pipe coil lifting device using the forklift.

13. The method of claim 12, wherein the convex upper surface overlaps upon a first outside surface of the first channel and a second outside surface of the second channel to facilitate stiffening the pipe coil lifting device.

14. The method of claim 12, wherein the pipe coil lifting device comprises a coating applied on the convex upper surface of the pipe coil lifting device.

* * * * *